Jan. 3, 1956  J. A. ANDERSON, JR., ET AL  2,729,688
PRODUCTION OF NAPHTHALENE
Filed Oct. 26, 1953
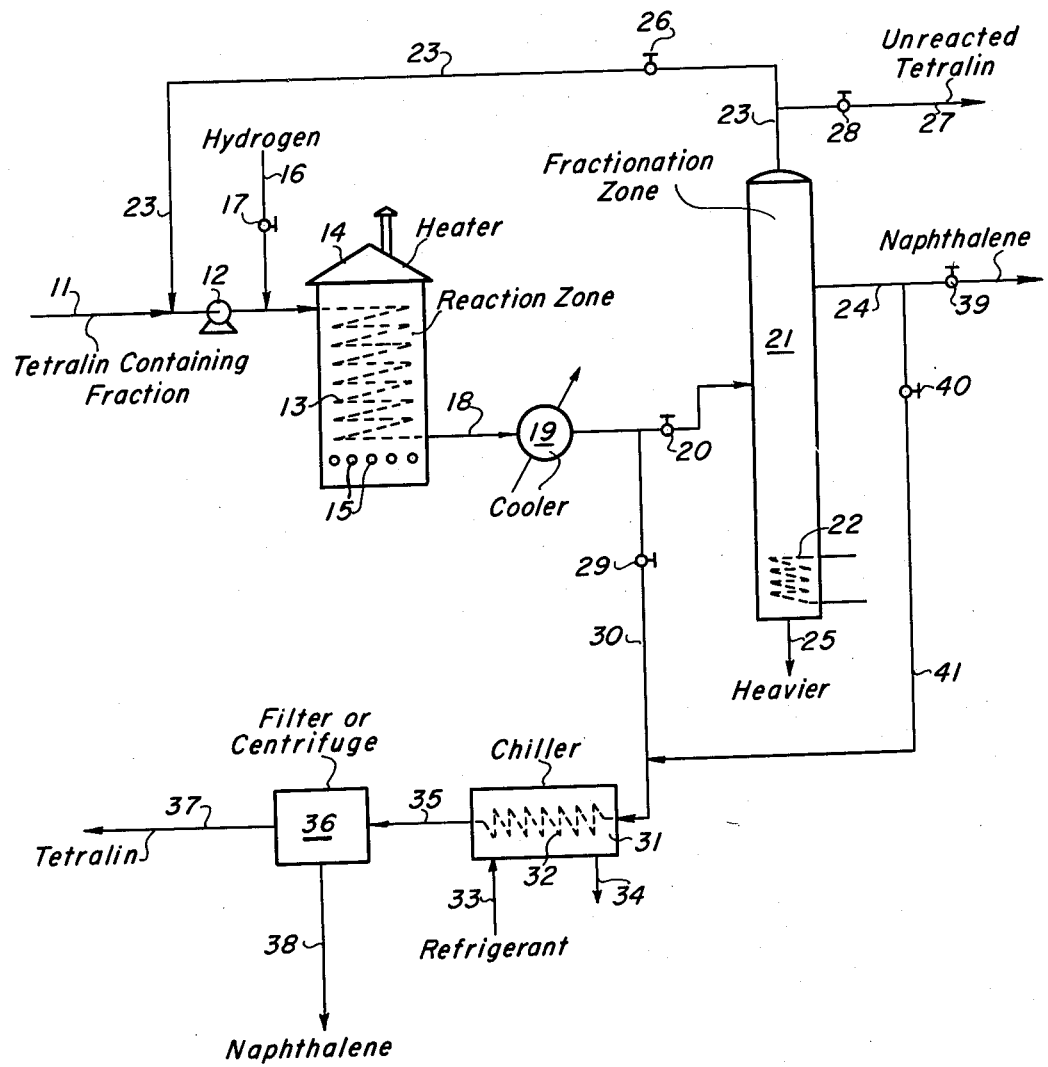
INVENTORS.
James A. Anderson Jr.,
Edward J. Hoffmann,
BY
ATTORNEY

United States Patent Office 2,729,688
Patented Jan. 3, 1956

2,729,688
PRODUCTION OF NAPHTHALENE

James A. Anderson, Jr., and Edward J. Hoffmann, Baytown, Tex., assignors, by mesne assignments, to Esso Research and Engineering Company, Elizabeth, N. J., a corporation of Delaware Application October 26, 1953, Serial No. 388,140

5 Claims. (Cl. 260—668)

The present invention is directed to a method for producing naphthalene. More particularly, the invention is directed to a method for producing naphthalene from a tetralin-containing hydrocarbon fraction. In its more specific aspects, the invention is concerned with producing naphthalene by subjecting tetralin to a high temperature and specific conditions.

The present invention may be briefly described as involving a method for producing naphthalene in which a tetralin-containing hydrocarbon fraction boiling in the range from about 350° to about 650° F. is subjected to an elevated temperature in the range between 1200° and 1400° F. in a reaction zone free from active catalytic material. The tetralin-containing hydrocarbon is subjected to the said high temperature at a pressure in the range between about 400 and about 1000 pounds per square inch gauge for a time in the range from about 2 to about 120 seconds in the presence of hydrogen ranging from about 4000 to about 10,000 standard cubic feet of hydrogen per barrel of feed hydrocarbon. A product is produced containing naphthalene which is recovered and which may be subjected to treatment for segregation of the naphthalene.

The present invention also contemplates a method of producing naphthalene by subjecting tetralin to the specified conditions of temperature, pressure, and time of contact in the presence of hydrogen.

The hydrocarbon fraction from which the naphthalene is produced from tetralin may be any hydrocarbon fraction containing tetralin boiling in the range from about 350° to about 650° F. It may be desirable that the tetralin be concentrated in the hydrocarbon fraction before subjecting the tetralin-containing fraction to the desired conditions of this invention. The concentration operation may be suitably accomplished by solvent extracting the tetralin-containing fraction followed by distillation, if desired, to recover the fraction for subjecting to the operation in accordance with the present invention. A solvent extract for use as a feed stock in the present invention may be obtained. A solvent extraction operation at a low temperature is suitably conducted in the range from —30° to +10° F. utilizing liquefied sulfur dioxide as the solvent. Other solvents with other conditions may be used, such as furfural, nitrobenzene, phenol, and the like solvents well known for concentrating aromatic hydrocarbons and separating them from paraffinic and other saturated hydrocarbons. The tetralin-containing fraction may also be prepared for use in the present invention by subjecting a tetralin-containing fraction to adsorption conditions in which the tetralin-containing fraction is contacted with a selective adsorbent of commerce, such as silica gel and the like.

The operation in accordance with the present invention is conducted under non-catalytic conditions. Stating this otherwise, the operation is purely a thermal operation in the presence of hydrogen. It is important, therefore, that the reaction zone in which the tetralin is exposed or subjected to the conditions enumerated be free from active catalytic material. Thus the reaction zone walls must be free from active catalytic material, such as free metallic iron and the like, and the reaction zone space itself must be free of active catalytic materials. In other words, in the present invention there is an absence of active catalytic material, either as contacting surfaces on the walls or as materials which fill the reaction zone and provide a catalytic surface. This may be accomplished by providing a reaction zone having ceramic surfaces or by constructing the reaction zone of alloys so that free metallic iron does not exist as such at the reaction surfaces. Chrome-nickel alloy of the 8–18 and 25–20 type may be used for construction of the reaction zone and to provide a non-catalytic surface.

The conditions to be employed in the practice of the present invention encompass a temperature in the range between about 1200° and about 1400° F. A preferred temperature is from about 1250° to about 1350° F. When substantially pure tetralin is the feed stock a temperature in the range between about 1300° and 1350° F. may suitably be used. For example, tetralin has been converted substantially to naphthalene with high selectivity at about 1313° F.

Pressures may range from about 400 to about 1000 pounds per square inch gauge with a preferred range between about 500 and 700 pounds per square inch gauge. When charging substantially pure tetralin, pressures may range from about 575 to 625 pounds per square inch gauge with tetralin being converted with high selectivity to naphthalene at about 600 pounds per square inch gauge.

The tetralin-containing fraction is subjected to the high temperatures and pressures for a time in the range from 2 to 120 seconds with a preferred range of about 5 to about 50 seconds. When charging substantially pure tetralin, a time of contact between about 5 and about 20 seconds is desirable. For example, at about 9 seconds contact time pure tetralin is converted with high selectivities to naphthalene.

Hydrogen is employed in the practice of the present invention and an amount of hydrogen in the range from 4000 to 10,000 standard cubic feet per barrel of tetralin-containing hydrocarbon should be employed. A preferred range for the hydrogen is from about 4000 to about 8000 standard cubic feet per barrel of hydrocarbon feed. Desirable results are obtained in producing naphthalene from tetralin with hydrogen in an amount of about 4000 to about 6000 standard cubic feet per barrel of tetralin. Thus in converting substantially pure tetralin to naphthalene, very desirable results have been obtained with 4400 standard cubic feet of hydrogen per barrel of tetralin. A hydrogen containing gas such as produced in hydroforming, or other catalytic dehydrogenation processes may be employed.

The invention will be further illustrated by reference to the drawing in which the single figure is a flow diagram of a preferred mode.

Referring now to the drawing, numeral 11 designates a charge line by way of which a tetralin-containing fraction, such as a sulfur dioxide extract, is introduced into the system. The tetralin-containing fraction is pumped by pump 12 into a reaction zone 13 arranged in a heater 14. The reaction zone 13 has surfaces free of metallic iron and contains no active catalytic material, either as surfaces or filling the space in the reaction zone. In reaction zone 13 the temperature of the tetralin-containing fraction is raised to a temperature in the range between about 1200° and about 1400° F. by means of heat supplied to the coil 13 by way of burners 15 to which fuel, such as natural gas, is fed by means not shown.

Prior to entry of the tetralin-containing fraction into reaction zone 13, it has admixed with it in line 11 an amount of hydrogen in the range stated which is introduced by way of line 16 controlled by valve 17 from a source not shown.

In reaction zone 13 the tetralin is converted in a dehydrogenation-dealkylation reaction substantially completely to naphthalene with removal of substantially all of the alkyl side chains, if any, on the tetralin rings. In other words, when the tetralin is an alkyl tetralin, it is both dealkylated and dehydrogenated to form naphthalene.

The product is formed in reaction zone 13 and is withdrawn therefrom by line 18 and passed through a cooling zone 19 which reduces the temperature of the product to distillation temperatures. The product flows through line 18 controlled by valve 20 into a fractional distillation zone 21 which may suitably be a plurality of fractional distillation towers provided with means for inducing reflux, condensing and cooling means, as well as internal vapor-liquid contacting means to obtain a sharp separation. For convenience, zone 21 is shown as a single fractional distillation tower provided with a heating means illustrated by a coil 22.

Conditions are adjusted in zone 21 to remove unreacted tetralin as an overhead fraction by line 23 and to withdraw as a side stream the desirable naphthalene by line 24. Heavier fractions, if any, may be withdrawn from zone 21 by line 25.

The unreacted tetralin removed by line 23 is preferably recycled to line 11 by opening valve 26. However, it may be desirable to withdraw the unreacted tetralin by way of line 27 controlled by valve 28.

It is possible to separate unreacted tetralin from naphthalene by virtue of the divergence in boiling points. Thus naphthalene boils around 218° C. and tetralin boils around 207° C.

It is also possible to separate the unreacted tetralin from the naphthalene by fractional crystallization since the tetralin has a melting point of −30° C. and the naphthalene has a melting point of 80° C. Therefore, we contemplate that valve 20 may be closed and valve 29 in line 30 may be opened allowing the naphthalene-containing fraction to be routed by line 30 into a chilling zone 31 which is provided with a coil 32 and lines 33 and 34 for circulating refrigerant through chilling zone 31. Suitably, chilling zone 31 may be a scraped surface chiller of the type well known on the market. In any event, the temperature of the fraction flowing through line 30 is chilled or cooled to a sufficient degree to cause formation of crystals of the naphthalene and to leave the tetralin in a liquid condition. The chilled naphthalene-containing stream is then discharged by line 35 into filtration or centrifugation zone 36 for separation of crystals of naphthalene from the tetralin. The liquid tetralin is removed from filtration or centrifugation zone 36 by line 37 while the naphthalene crystals are recovered by line 38.

As a modification of the foregoing procedures using both fractionation and crystallization, it is contemplated that the naphthalene recovered by line 24 may be recovered as an overhead fraction. Thus valve 26 in line 23 and valve 28 in line 27 would remain closed and the fraction recovered by line 24 would contain both the unreacted tetralin and the naphthalene. Valve 39 in line 24 would be closed and valve 40 in branch line 41 would be opened allowing the mixture of unreacted tetralin and naphthalene to be discharged into line 30. It will be understood, of course, that in this sequence of operations valve 29 in line 30 would be closed. By practicing any one of the several modes of recovery, it is possible to recover substantially pure naphthalene for use as chemical raw materials or, as such, for the many uses to which napthalene is amenable.

In order to illustrate the invention further, substantially pure tetralin was charged to a reaction zone free of active catalytic material at a temperature of 1313° F., at a pressure of 600 pounds per square inch gauge, with 4400 standard cubic feet of hydrogen per barrel of tetralin being employed. The reaction time in the reaction zone was about 9.3 seconds. Under these conditions, a product was obtained which solidified. This product was analyzed and found to contain 59.4% by weight of naphthalene and 4.7% of alpha and beta methyl naphthalenes distributed about equally between the two alkyl naphthalenes. The remainder was unreacted tetralin and possibly some heavier compounds.

While the present invention has been described and illustrated by tetralin and fractions containing tetralin, it is contemplated that the word "tetralin" includes alkyl tetralins having from 1 to 8 alkyl groups in the molecule. The alkyl groups may contain from 1 to 4 carbon atoms. As examples of typical alkyl tetralins which may be used in the practice of the present invention, mention might be made of 6 methyl tetralin, 5 methyl tetralin, 2 methyl tetralin, 1,methyltetralin, 1,2 dimethyltetralin, 1,1 dimethyltetralin, 1,2,3 trimethyltetralin, 1,2,3,4,5,6,7,8 octamethyltetralin, and 5,6,7 trimethyltetralin; ethyl, propyl and butyl groups can also be substituted into the tetralin molecule in the positions given for the methyltetralin examples.

The nature and objects of the present invention having been completely described and illustrated, what we wish to claim as new and useful and to secure by Letters Patent is:

1. A method for producing naphthalene which comprises subjecting a tetralin-containing hydrocarbon fraction boiling in the range from about 350° to about 650° F. in a reaction zone free of active catalytic material to a temperature in the range between about 1200° and about 1400° F. at a pressure in the range between about 400 and about 1000 pounds per square inch gauge for a time in the range between about 2 and about 120 seconds in the presence of hydrogen in an amount in the range between 4000 and 10,000 standard cubic feet per barrel of said hydrocarbon fraction to produce a product containing naphthalene, and recovering said product.

2. A method in accordance with claim 1 in which the tetralin contains 1 to 8 alkyl groups, said alkyl groups having from 1 to 4 carbon atoms.

3. A method for producing naphthalene which comprises subjecting a tetralin-containing hydrocarbon fraction boiling in the range between about 350° and about 650° F. in a reaction zone free of active catalytic material to a temperature in the range between about 1250° and 1350° F. at a pressure in the range between about 500 and about 700 pounds per square inch gauge for a time in the range between 5 and 50 seconds in the presence of hydrogen in an amount in the range between 4000 and 8000 standard cubic feet per barrel of said hydrocarbon fraction to produce a product containing naphthalene and recovering said product.

4. A method for producing naphthalene which comprises subjecting tetralin in a reaction zone free of active catalytic material to a temperature in the range between 1300° and 1350° F. at a pressure in the range between 575 and 625 pounds per square inch gauge for a time in the range between 5 and 20 seconds in the presence of hydrogen in an amount between 4000 and 6000 standard cubic feet per barrel of said tetralin to produce a product consisting essentially of naphthalene and unconverted tetralin, and recovering said product.

5. A method in accordance with claim 4 in which the temperature is approximately 1313° F., the pressure approximately 600 pounds per square inch gauge, the time approximately 9 seconds, and the hydrogen approximately 4400 standard cubic feet.

References Cited in the file of this patent

UNITED STATES PATENTS

| | | |
|---|---|---|
| 2,475,977 | Meier | July 12, 1949 |

FOREIGN PATENTS

| | | |
|---|---|---|
| 281,298 | Great Britain | Nov. 15, 1928 |

OTHER REFERENCES

Jones: "Jour. Chem. Soc." (London), vol. 107 (1915), pages 1587–88.

Sachanen: Ber. vol. 62 (1929), pages 658–677, especially pages 668–669.

Gruse et al.: "Chemical Technology of Petroleum," 2nd ed. (1942), pages 42–45. McGraw-Hill, New York.